Sept. 1, 1959  C. A. GENTRY, JR  2,902,069
COMBINED LOG DEBARKER AND SAW
Filed April 2, 1957  4 Sheets-Sheet 1
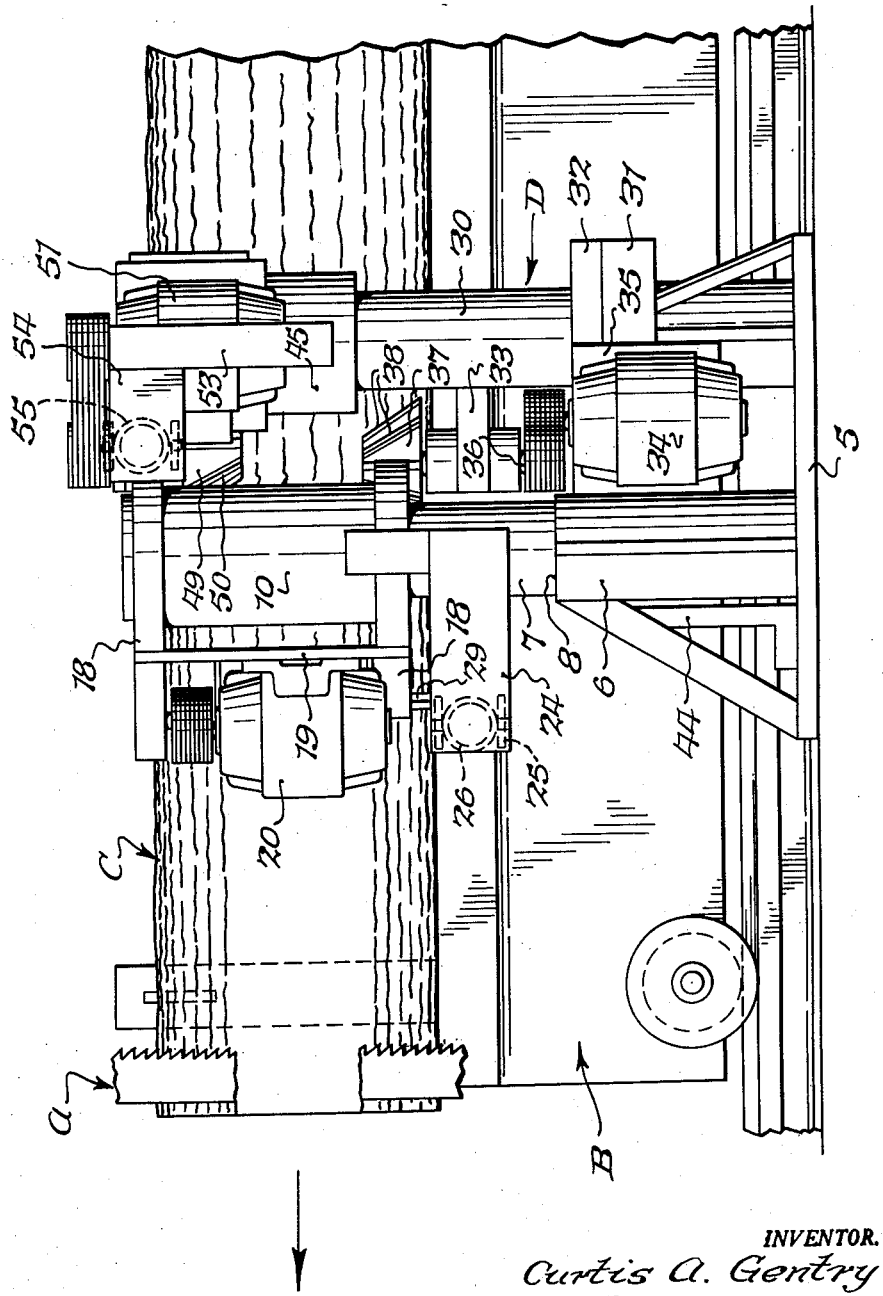
INVENTOR.
Curtis A. Gentry Jr.
BY
Thomas E. Tate
Agent.

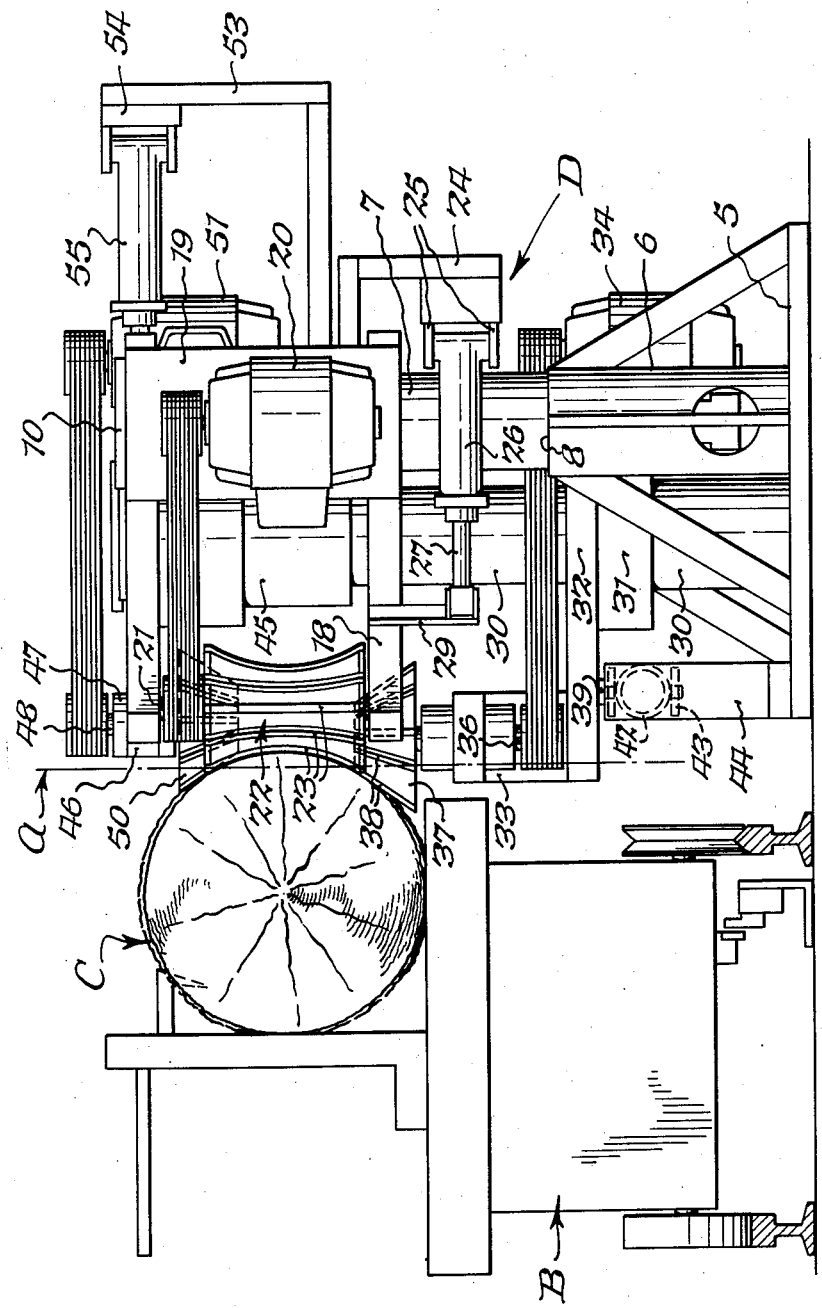

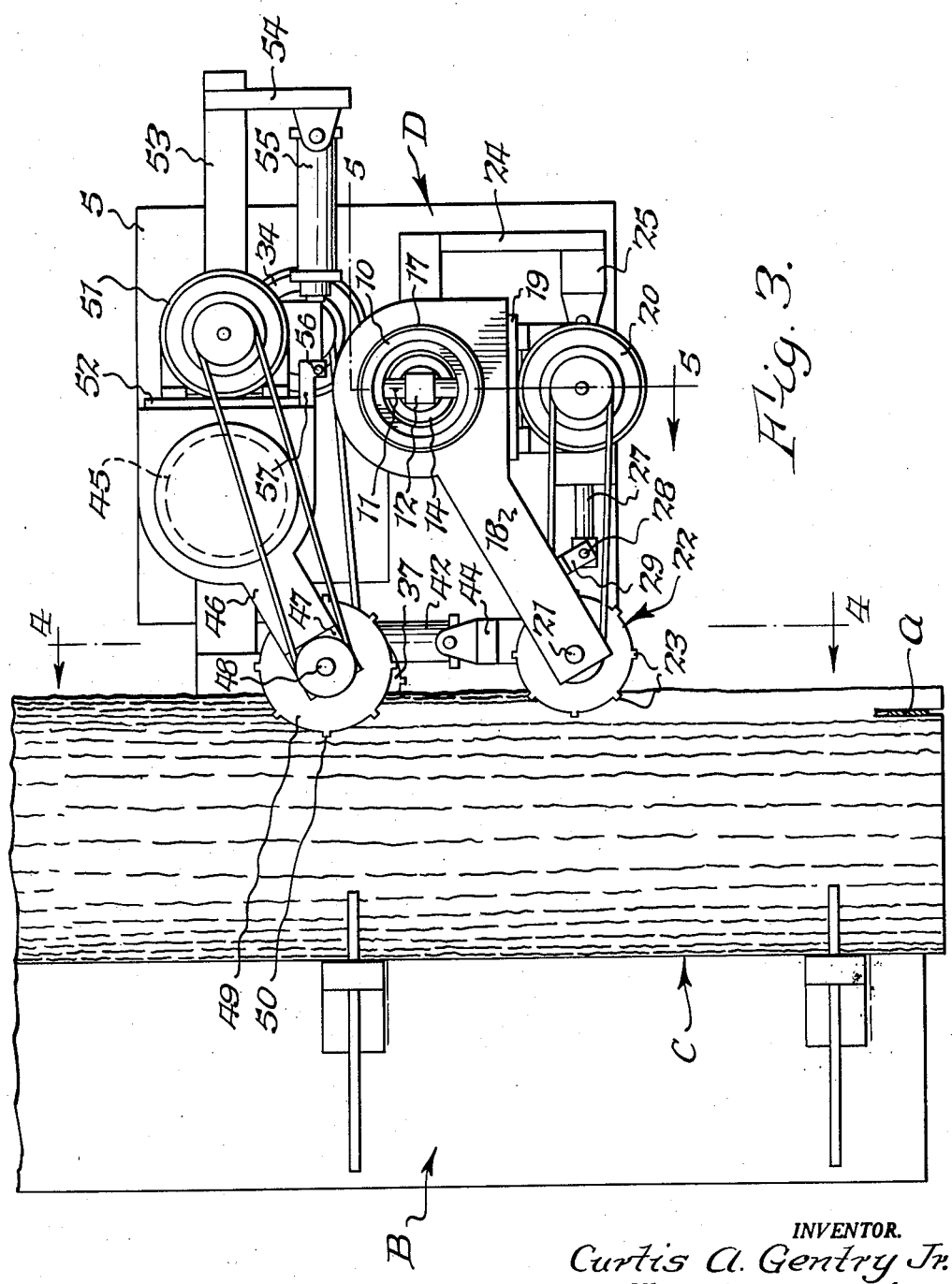

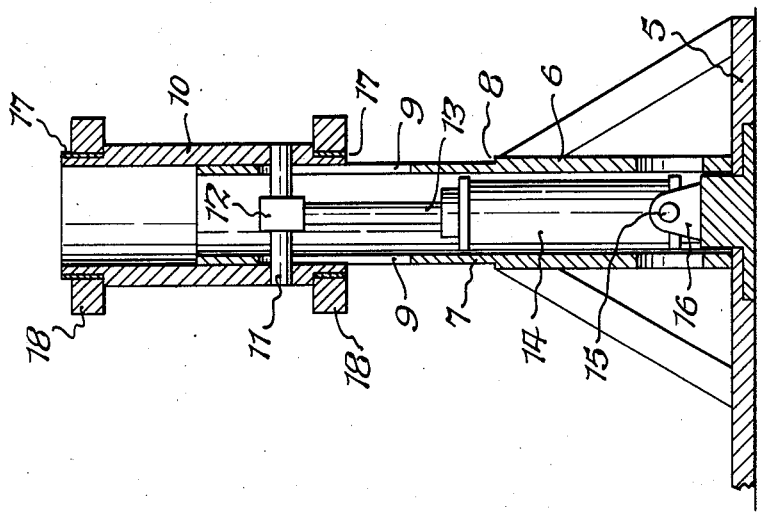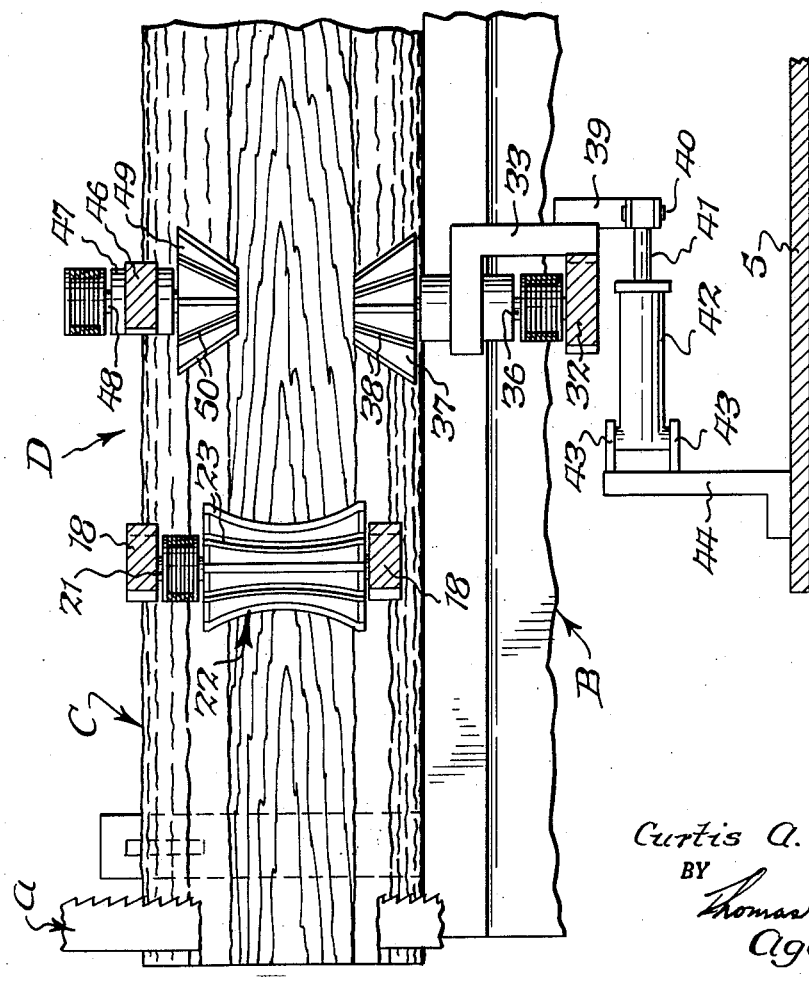

United States Patent Office 2,902,069
Patented Sept. 1, 1959

2,902,069

COMBINED LOG DEBARKER AND SAW

Curtis A. Gentry, Jr., Chickasaw, Ala.

Application April 2, 1957, Serial No. 650,169

3 Claims. (Cl. 144—3)

This invention relates to new and useful improvements in sawmills generally, and particularly seeks to provide a novel combination log sawing and debarking unit.

With the increased desirability of making practical use of sawmill waste such as slabs and edge trim pieces which can be cut up into chips for pulp mill use it has become necessary to devise means for removing bark from such types of sawmill waste prior to the time that the waste is chipped. Heretofore it has been customary for whole sawmill logs to be passed through a debarking machine as an independent operation prior to the time at which the log is sawed into timber or lumber. In those cases where the whole log is sawed before any bark removal has been effected it has also been customary for the slabs and edgings to be put through an independent bark-removing operation prior to the time at which they are fed into a wood chipper. In either of these prior practices it is, of course, obvious that additional labor and supplemental conveyors are required for these separate handling operations.

However, through the use of a combination sawing and debarking unit constructed in accordance with this invention the desired bark removal may be effected simultaneously with the sawing of a log without disrupting any of the normal sawing functions or without reducing the speed of the sawing operations.

Accordingly, it is an object of this invention to provide a combination log-sawing and debarking machine.

A further object of this invention is to provide a machine of the character stated in which the debarking devices are operatively positioned at the sawing station and are effective to remove portions of the bark from a saw log as it is being moved into and through its sawing position by the saw log carriage at a saw mill head rig.

A further object of this invention is to provide a machine of the character stated in which the bark of a saw log is first removed in the zone which will be spanned by the chord of the saw cut when the first slab is removed, after which the devices for removing the bark in that zone are retracted during subsequent saw cuts on the same log.

A further object of this invention is to provide a machine of the character stated in which devices are provided for removing bark from the edge portions of the cut on each succeeding cut while the log is maintained in the same rotational position on the carriage.

A further object of this invention is to provide a machine of the character stated in which the bark-removing devices are readily adjustable, horizontally and vertically, in order that they may be made to readily conform to changes in diameter and surface contour of any log being operated upon.

A further object of this invention is to provide a machine of the character stated which may be readily adapted to existing sawmill installations or incorporated into new sawmill installations at a moderate cost.

With these and other objects in view, the nature of which will be more apparent, the invention will be more fully understood by reference to the drawings, the accompanying detailed description and the appended claims.

In the drawings:

Fig. 1 is a front elevation of a combined sawing and debarking machine constructed in accordance with this invention;

Fig. 2 is a left end elevation thereof;

Fig. 3 is a top plan view thereof;

Fig. 4 is a fragmentary vertical section taken along line 4—4 of Fig. 3; and

Fig. 5 is a fragmentary vertical section taken along line 5—5 of Fig. 3.

Referring to the drawings in detail, the invention as illustrated is embodied in a combination sawing and debarking unit which includes a band saw generally indicated at A, a reciprocable saw carriage generally indicated at B which supports a saw log generally indicated at C, and a debarking assembly generally indicated at D which is positioned slightly ahead of the saw A in order that the removal of bark may be effected ahead of the saw cut but simultaneously therewith. It will be appreciated that while a band saw has been indicated as the type of saw which can be used in connection with this machine a circular saw can be used equally as well.

In any sawing operation of this nature it will be appreciated that the horizontal plane of the saw carriage is fixed as is the vertical plane of the saw cut. The surface of a log carried by the carriage in essence moves in three dimensions with respect to any given reference point as the carriage is reciprocated. It moves longitudinally due to the reciprocation of the saw carriage, laterally (at right angles to the plane of the saw cut) due to surface irregularities and to changing diameters along the length of the log and vertically due to variation in diameters along the length of the log as well as any crookedness in the log. Thus in a combination machine as disclosed herein the elements of the debarking assembly D must be relatively adjustable with respect to the log rather than vice versa.

In sawing logs to prepare lumber the normal sequence is to first make a slab cut and then saw either by a successive number of line or board cuts parallel to the first slab cut or rotate the log 90° or 180° for additional slab cuts to form cants. Regardless of the precise sequence of saw cuts it is desirable to remove the bark concurrently with the making of the saw cuts in order that the waste slabs and edgings will be in form for ready recovery as pulp mill chips by simple passage through a chipper without the necessity for a separate debarking operation which would entail the use of additional equipment such as conveyors and, of course, of added labor.

In order to effect the desired debarking of the log as sawing operations are performed upon it the debarking assembly D is positioned adjacent the path of travel of the saw carriage B and slightly ahead of saw A. The debarking assembly includes a base plate 5 to which is affixed a vertically disposed cylindrical standard 6 having an upper portion 7 of reduced diameter, thereby defining an abutment shoulder 8 at its lower end. The upper portion 7 of the cylindrical standard 6 is provided with a pair of diametrically opposed slots 9, 9 (see Fig. 5) and carries a vertically reciprocable sleeve 10 upon which is mounted the main debarking tool, as will be hereinafter more fully described.

A wrist pin 11 extends across the lower end of the sleeve 10 and projects through the slots 9, 9 in the upper portion 7 of the cylindrical standard and is pivotally connected as at 12 to the upper end of a piston 13 of an air or hydraulic cylinder 14 pivotally connected as at 15 to lugs 16 rigidly affixed to the base 5. Thus the sleeve 10 and its associated debarking tool may be raised and lowered vertically through operation of the air or hydraulic cylinder 14 through the use of suitable control valves (not shown).

The upper and lower ends of the sleeve 10 are each provided with a bushing 17 upon which is pivotally mounted a radially extending arm 18. The two arms 18 extend radially in spaced parallel alignment and are restrained from relative angular movement with respect to one another by a motor mounting plate 19 (Figs. 1 and 3) extending therebetween and rigidly affixed thereto.

An electric motor 20 is affixed to the plate 19 and is belt-connected to a vertically disposed driven shaft 21 journalled in the outer ends of the arms 18. A rotary debarking tool generally indicated at 22 is affixed to the shaft 21 and is contoured in such a manner as to resemble a hyperboloid, but with a constant radius of curvature. A plurality of longitudinally extending bars 23 are welded or otherwise firmly affixed to the external surfaces of the debarking tool 22 and serve as the elements which actually cause the bark to be stripped from the adjacent portion of a saw log as it is being moved by the saw carriage relative to the debarking assembly.

Since most saw logs are neither completely straight nor of uniform diameter throughout their length means must be provided to move the debarking tool 22 toward and away from the saw log in order to maintain it in yieldable contact with the bark surface thereof and with a proper amount of operative pressure. To accomplish this the sleeve 10 carries a depending bracket 24 (see Fig. 2), the lower end of which is provided with a pair of spaced lugs 25, 25 between which is pivotally connected one end of air or hydraulic cylinder 26. The cylinder 26 is provided with a piston 27 pivotally connected at its outer end as at 28 to the lower end of a depending bracket 29 rigidly affixed to the lower arm 18 intermediate the ends thereof. Operation of the cylinder 26 through the medium of suitable control valves (not shown) will effect angular rotation of the arms 18 in one direction or another relative to the sleeve 10 upon which they are pivotally mounted, and consequently the debarking tool 22 will be moved towards or away from the saw log and when in contact therewith may be maintained in such contact at any desired operating pressure.

Thus operation of the cylinder 26 compensates for lateral variations in the saw log contour towards and away from the plane of saw cut and operation of the cylinder 14 effects a raising or lowing of the debarking tool 22 to compensate for vertical variations in the surface contour of the log.

If all saw logs were of the same diameter and were perfectly straight throughout their length a single properly contoured rotary debarking tool would be all that was necessary to effect the desired debarking operation simultaneously with the sawing. However, since this ideal condition is never reached in ordinary saw mill operations it is desirable to provide supplemental debarking tools in order to be assured that the bark will be properly removed from the saw log at all times and particularly after the first slab cut has been made.

To this end a second cylindrical standard 30 (see Figs. 1 and 2) somewhat taller than the standard 6 is rigidly mounted on the base plate 5. A collar 31 is rigidly secured to the standard 30 near its lower end and supports a radially extending arm 32, one end of which is pivotally mounted on the standard 30 and the other free end of which is provided with an upstanding bracket 33. An electric motor 34 is affixed to a plate 35 rigidly secured to the pivotal end of the arm 32 and is belt-connected to the lower end of a shaft 36 journalled in the bracket 33. The upper end of the shaft 36 carries a generally frusto-conical lower supplemental debarking tool 37 provided with a plurality of debarking bars 38 rigidly affixed thereto.

The outer end of the arm 32 is provided with a depending bracket 39 (see Fig. 4) which is pivotally connected as at 40 to the free end of a piston rod 41 extending from the outer end of an air or hydraulic cylinder 42 having its inner end pivoted between a pair of brackets 43, 43 affixed to an upstanding post 44 secured to the base 5.

By the above described cylinder means the arm 32 may be pivoted about the standard 30 in order to move the lower supplemental debarking tool 37 toward and away from the saw log. It will be noticed that no provision is made for the raising and lowering of the supplemental debarking tool 37 because it is not necessary to do so in view of the fact that the horizontal plane of the saw carriage, and consequently the bottom plane of contact of a saw log carried thereby, is fixed, and lateral movement towards or away from the saw log by the supplemental debarking tool 37 is adequate to insure that the bark will be properly removed from those lower portions of the log which will become the bottom edges of successive pieces of lumber as successive parallel saw cuts are made.

The standard 30 is of the same construction as the standard 6 and supports a vertically reciprocable sleeve 45. An arm 46 is pivotally mounted at one end on the upper end of the sleeve 45 and is provided at its outer end with an upstanding bracket 47 in which is journalled a vertically disposed shaft 48 carrying at its lower end an inverted, generally frusto-conical top supplemental debarking tool 49 provided with a plurality of debarking bars 50 rigidly affixed thereto. The shaft 48 is belt-connected to a motor 51 affixed to a plate 52 rigidly affixed to the inner end of the arm 46. A bracket 53 extends rearwardly from the sleeve 45 and is provided with a lateral extension 54 to which is pivotally connected one end of an air or hydraulic cylinder 55, the piston rod of which is pivotally connected as at 56 to a bracket 57 affixed to the inner end of the arm 46 (see Fig. 3). The above described air or hydraulic cylinder means 55 enable the arm 46 to be pivoted relative to the sleeve 45 and thus move the top supplemental debarking tool 49 towards or away from the saw log.

It has already been mentioned that the structure of the standard 30 is similar to that of the standard 6, and it will be appreciated that the standard 30 also includes an elevating cylinder similar to the cylinder 14 in order to effect alterations in the vertical position of the sleeve 45 and consequent vertical adjustment of the top supplemental debarking tool 49.

In operation a fresh saw log is dogged down onto the saw carriage B in the usual way, and feeding of the carriage towards the saw is commenced. The front end of the saw side of the log first will be brought into engagement with such of the debarking tools as may be required in order to remove the bark from the outside of the first slab cut, and continued moving of the carriage will immediately thereafter bring the front end of the saw log into contact with the saw to commence and continue the first slab cut. As the normal forward feeding motion of the saw carriage continues in this manner it is obvious that the first slab cut will be effected in a normal manner and that the debarking tools, at least those that are in use, will continue to function in the removal of the bark.

By reference to Fig. 1 of the drawings it will be seen that the debarking tools remove enough bark from the saw side of the log as to fully span the chord of the first slab cut. In Fig. 4 of the drawings there is shown the condition of the log after the first slab cut has been completed with the second parallel cut being started, and it can readily be observed that both of the lower and upper supplemental debarking tools 37 and 49 are functioning to remove bark from the areas that become the edges of the second piece of lumber being cut from the log. Prior to the time at which this second cut commences the main debarking tool 22 has been retracted from its position intersecting the path of travel of the log in order to permit the saw carriage to be retracted and the log re-set for the second cut. During this retractive movement of the saw carriage the supplemental debarking tools have also been withdrawn from their positions intersecting the path of travel of the log, but as the saw carriage again moves forward so that the second saw cut may be commenced they are again moved into position to engage the bark. During this second cut and all successive parallel cuts until the log may be rotated 90° or 180° for another slab cut the debarking tool 22 is maintained in its withdrawn or disengaged position with respect to the log.

It is believed to be apparent from the foregoing description that as the log changes diameter and as variations in its vertical configuration occur during feeding movement of the saw carriage, suitable vertical adjustments to the main debarking tool 22 or the top supplemental debarking tool 49 will be made in order to assure complete removal of bark in the desired zones.

Thus a combined sawing and debarking unit constructed in accordance with this invention enables the simultaneous sawing and saw-side debarking of saw logs without in any way affecting the normal sequence of sawing operations or the speed thereof.

It is, of course, to be understood that various details of arrangements and proportions of parts may be modified within the scope of the appended claims.

I claim:

1. A log sawing and debarking machine including a power driven saw, a reciprocating saw carriage for supporting individual saw logs and traversing them longitudinally past said saw, a rotary debarking tool located on the saw side of said carriage adjacent the cutting side of said saw for removing bark from those surface portions of a saw log as lie beyond the plane of saw cut in a direction away from said carriage during each saw-feeding passage of said carriage, said debarking tool being so proportioned as to be capable of removing bark from that portion of a saw log that becomes a slab after the first saw cut, means for withdrawing said debarking tool from a position intersecting the path of travel of the saw side of a saw log upon commencement of the return movement of said carriage following completion of the first saw cut, a pair of independently mounted supplemental rotary debarking tools positioned to remove bark from those portions of a saw log as become lumber edges after each successive additional saw cut, means for withdrawing said supplemental debarking tools from their position intersecting the path of travel of the saw side of a saw log during each return movement of said carriage following completion of a saw cut, and means for driving all of said debarking tools.

2. A log sawing and debarking machine including a power driven saw, a reciprocating saw carriage for supporting individual saw logs and traversing them longitudinally past said saw, a rotary debarking tool located on the saw side of said carriage adjacent the cutting side of said saw for removing bark from those surface portions of a saw log as lie beyond the plane of saw cut in a direction away from said carriage during each saw-feeding passage of said carriage, said debarking tool being so proportioned as to be capable of removing bark from that portion of a saw log that becomes a slab after the first saw cut, means for withdrawing said debarking tool from a position intersecting the path of travel of the saw side of a saw log upon commencement of the return movement of said carriage following completion of the first saw cut, a pair of independently mounted supplemental rotary debarking tools positioned to remove bark from those portions of a saw log as become lumber edges after each successive additional saw cut, means for withdrawing said supplemental debarking tools from their position intersecting the path of travel of the saw side of a saw log during each return movement of said carriage following completion of a saw cut, means for driving all of said debarking tools, and means to vary the effective operational positions of all of said debarking tools during saw-feeding passage of said carriage in order to compensate for variations in the surface contours and diameters of a saw log when supported thereon.

3. A log sawing and debarking machine including a power driven saw, a reciprocating saw carriage for supporting individual saw logs and traversing them longitudinally past said saw, a rotary debarking tool located on the saw side of said carriage adjacent the cutting side of said saw for removing bark from those surface portions of a saw log as lie beyond the plane of saw cut in a direction away from said carriage during each saw-feeding passage of said carriage, said debarking tool being so proportioned as to be capable of removing bark from that portion of a saw log that becomes a slab after the first saw cut, means for withdrawing said debarking tool from a position intersecting the path of travel of the saw side of a saw log upon commencement of the return movement of said carriage following completion of the first saw cut, a pair of upper and lower independently mounted supplemental rotary debarking tools positioned to remove bark from those portions of a saw log as become lumber edges after each successive additional saw cut, means for withdrawing said supplemental debarking tools from their position intersecting the path of travel of the saw side of a saw log during each return movement of said carriage following completion of a saw cut, means for driving all of said debarking tools, and means for varying the horizontal and vertical operational positions of said debarking tool and the upper of said supplemental debarking tools and for varying the horizontal operational positions of the lower of said supplemental debarking tools during saw-feeding passage of said carriage in order to compensate for variations in the surface contours and diameters of a saw log when supported thereon.

References Cited in the file of this patent

UNITED STATES PATENTS

| 339,539 | Esplin | Apr. 6, 1886 |
| 1,280,789 | McLennan | Oct. 8, 1918 |
| 1,825,041 | Babare | Sept. 29, 1931 |
| 2,478,807 | Critchfield | Aug. 9, 1949 |

FOREIGN PATENTS

| 192,852 | Germany | Nov. 19, 1907 |